United States Patent [19]

Blaser et al.

[11] 4,062,656
[45] Dec. 13, 1977

[54] FLUIDIZED BED APPARATUS

[75] Inventors: Don E. Blaser, Dover; Arthur C. Worley, Morristown, both of N.J.

[73] Assignee: Exxon Research and Engineering Company, Linden, N.J.

[21] Appl. No.: 685,458

[22] Filed: May 12, 1976

[51] Int. Cl.² .................................................. C10J 3/48
[52] U.S. Cl. ...................................... 48/73; 23/288 S; 34/57 A; 48/77; 48/99; 48/101; 110/28 J; 201/31; 239/553.3; 239/553.5
[58] Field of Search .................... 48/73, 77, 76, 86 R, 48/89, 99, 101, 202, 206, 210, 197 R; 23/288 S; 34/57 A, 10; 110/28 J, 31, 53; 122/4 D, 5; 201/31; 239/553.3, 553.5, 590.3, 590.5; 222/195

[56] References Cited

U.S. PATENT DOCUMENTS

| 3,040,439 | 6/1962 | Frost | 34/57 A |
|---|---|---|---|
| 3,277,582 | 10/1966 | Munro et al. | 34/57 A |
| 3,379,345 | 4/1968 | Gehrung | 222/195 |
| 3,737,283 | 6/1973 | Nikles | 34/57 A |
| 3,933,445 | 1/1976 | Mueller et al. | 48/197 R |

*Primary Examiner*—Robert L. Lindsay, Jr.
*Assistant Examiner*—George C. Yeung
*Attorney, Agent, or Firm*—Donald F. Wohlers

[57] ABSTRACT

A fluidized bed apparatus having an outer vessel provided at a lower region with a plenum chamber as well as a grid situated directly above the plenum chamber and carrying a plurality of nozzles through which gas flows from the plenum chamber into the space in the vessel above the grid. These nozzles provide a given pressure drop in the gas flowing therethrough while as the gas flows from the plenum chamber through each nozzle there is also provided by way of a suitable structure a preliminary pressure drop, so that a two-stage pressure drop is provided in the gas flowing through each nozzle from the plenum chamber into the vessel above the grid. In this way it is possible to achieve a flow of gas above the grid sufficient to maintain the particles suspended in the fluidized bed while attrition of the particles is maintained at a minimum so that very little if any fines flow out of the vessel with gas which is formed therein. According to this method, the particles are petroleum coke particles while the gas is a mixture of steam and air maintained in the plenum chamber at a pressure of only 1-5 psig above the pressure in the bed while at the region of the interior of the vessel above the grid the temperature is on the order of 1500°–1800° F.

The grid supporting the nozzles is sloped 3° to 5° downwards towards a center well and supporting member to allow solid agglomerations such as lumps of coke and slag to move radially inward into the well for withdrawal.

18 Claims, 8 Drawing Figures

FLUIDIZED BED APPARATUS

BACKGROUND OF THE INVENTION

The present invention relates to fluidized bed apparatus and methods for operating the same.

Apparatus of this type is conventionally used for the purpose of gasifying particles such as petroleum coke particles into a fuel gas such as methane gas. When utilizing a fluidized bed apparatus for such purposes, one of the problems encountered is in connection with attrition of the particles. In other words, the movement of the particles about in the fluidized bed in which they are suspended is sufficiently violent to cause the particles to impact each other in a highly undesirable manner creating fines which undesirably flow out of the reactor vessel, together with the generated fuel gas. As pointed out above, in the case of petroleum coke particles, this gas will be essentially a methane type of low BTU fuel gas. Thus, because of the attrition occurring in conventional fluidized beds it is unavoidable that an undesirably large amount of fines will issue from the reactor vessel with the gas achieved from the particles such as petroleum coke particles.

Moreover, in conventional fluidized bed apparatus there is a problem in connection with achieving a uniform distribution of the fluidizing gas over the grid as well as in connection with achieving proper support for the grid and maintenance of the grid at a temperature low enough to assure a long operating life. Furthermore, conventional nozzles tend undesirably to become clogged and replacement of the nozzles very often creates great difficulties.

SUMMARY OF THE INVENTION

It is accordingly a primary object of the present invention to provide a fluidized bed apparatus and method for operating the same which will avoid the above drawbacks.

Thus, it is primarily an object of the present invention to provide a fluidized bed apparatus and operating method according to which it becomes possible to treat particles such as petroleum coke particles in such a way that attrition thereof in the fluidized bed is maintained at a minimum so that in this way the amount of fines which issue from the reactor vessel with the desired fuel gas or the like is maintained at minimum.

Also, it is an object of the present invention to provide a construction which makes it possible to provide an effective support for the grid of the fluidized bed as well as to maintain the grid at a desirably low operating temperature.

In addition it is an object of the present invention to provide a fluidized bed apparatus according to which it becomes possible to automatically and continuously eliminate from the upper surface of the grid agglomerations of particles which may form on the grid.

In addition, it is an object of the present invention to provide a construction wherein the nozzles can readily be replaced when required and at the same time have a construction which will reduce clogging to a minimum.

A still further object of the invention is to provide an improved nozzle design which, even in the presence of severe erosion or total fracture, will not create severe maldistribution of the air/steam flow through the bed.

According to the invention, the fluidized bed apparatus includes an outer vessel having at a lower region a plenum chamber and a grid situated directly above the plenum chamber and carrying a plurality of nozzle means through which gas flows from the plenum chamber into the reactor vessel above the grid. The plurality of nozzle means provide a given pressure drop in the gas as it issues from the nozzle means into the space above the grid. According to the invention, a preliminary pressure-drop means is provided in the path of gas flow to each nozzle means at the region of the grid for providing a pressure drop preliminary to the pressure drop occurring as the gas issues out of each nozzle means into the space above the grid, so that by way of this two-stage pressure drop operation at each nozzle it is possible to achieve for the gas flowing into the vessel above the grid from the chamber a speed of flow which while sufficient to maintain the particles suspended in the fluidized bed nevertheless will maintain attrition of the particles to a minimum, even in the presence of nozzle failure. The splitting up of the total pressure drop between the plenum chamber and the bed into two pressure drop stages has a further significant advantage in the event of individual failure by corrosion or erosion of one or more nozzle assemblies. This is because the first stage orifice is integrally located in the base of the nozzle assembly in the plane of the grid so that even if the upper portion were to wear or break off the first stage orifice of the nozzle assembly would remain intact. Were this not the case, significant flow maldistribution across the bed would otherwise result.

According to the method of the invention, the pressure of the gas in the plenum chamber is on the order of 1-5 psig above bed pressure and in connection with the treatment of petroleum coke particles the gas is preferably a mixture of steam and air while the temperature in the reactor vessel is maintained on the order of 1500°-1800° F.

BRIEF DESCRIPTION OF THE DRAWINGS

The invention is illustrated by way of example in the accompanying drawings which form part of this application and in which.

DESCRIPTION OF THE PREFERRED EMBODIMENTS

Figure 1:
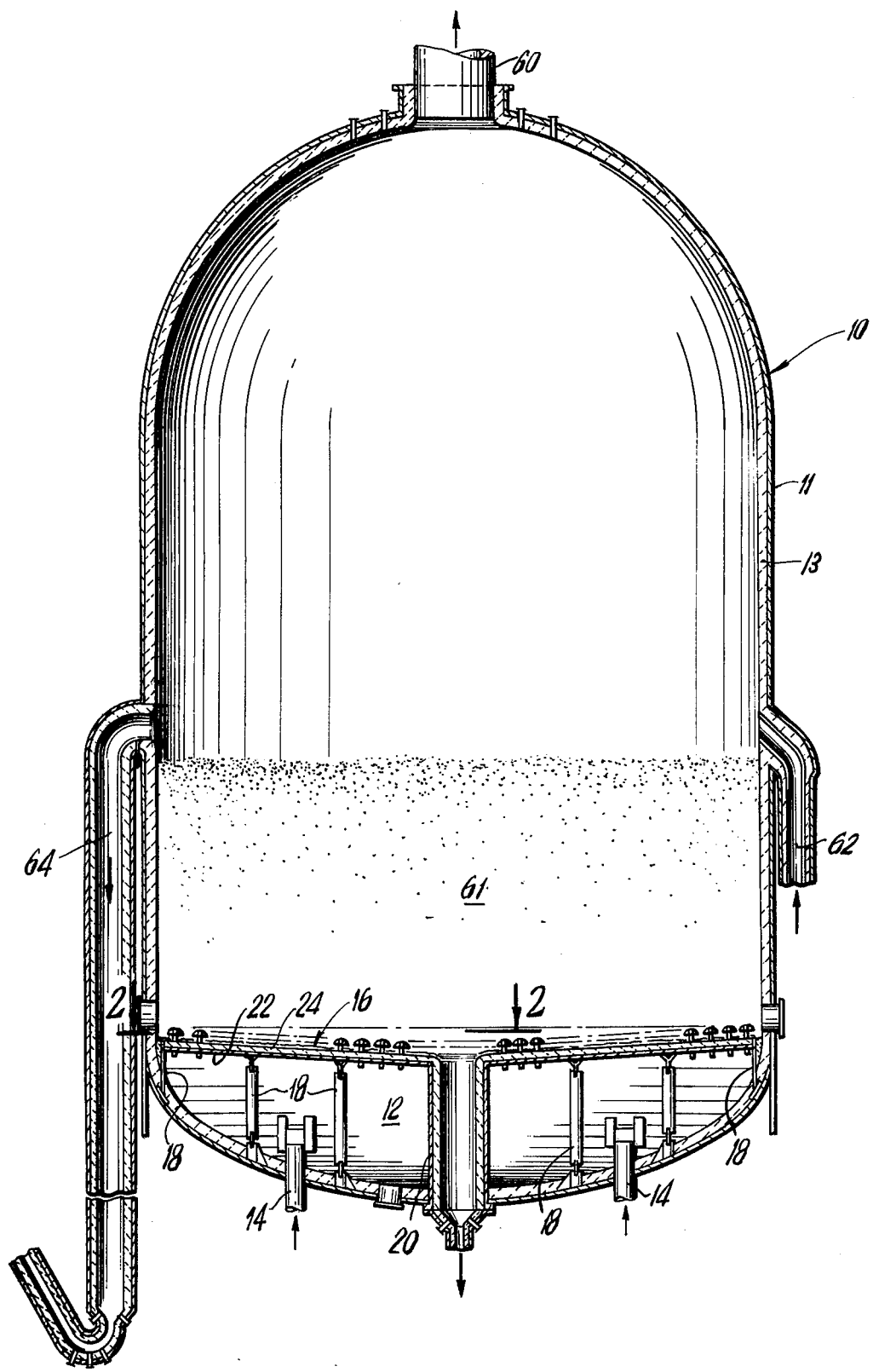
FIG. 1 is a simplified schematic sectional elevation of an embodiment of a fluidized bed apparatus according to the invention.

Referring now to FIG. 1, there is illustrated therein a fluidized bed apparatus including an outer vessel 10 having at a lower region thereof a plenum chamber 12 to which gas is supplied through suitable gas inlets 14. Situated in the lower region of the vessel 10 just above the plenum chamber 12 is a grid 16 supported by a number of upright supporting assemblies 18.

It will be noted from FIG. 1 that the grid 16 slopes downwardly from its outer periphery, which is supported at the inner surface of the vessel 10, toward the central region of the grid where the grid is again supported by a downwardly extending well 20. It will be seen that the well 20 along with the members 18 all contribute to the support of the grid. The center well 20 is connected to a lock hopper (not shown). The slope of the grid which is on the order of 3°–5° downwardly toward the center well allows large solids agglomerations such as lumps of coke, lumps of refractory or lumps of slag formed during gasification of coke particles, for example, to move slowly in a radial direction toward the grid center along the surface of the grid to the center well where these agglomerations can be withdrawn.

Such withdrawal is important since accumulation on the grid of agglomerations would undesirably influence the distribution of the gas which in the case of gasification of petroleum coke particles is preferably an air-steam mixture. Thus, without this withdrawal of the agglomerations there would otherwise be unavoidably localized high temperatures and concentration of slag formations particularly from trace metals such as vanadium and sodium contained in the petroleum coke particles.

The grid 16 includes a lower metal plate structure 22 which is covered by a thermal insulating refractory lining 24, and it will be noted that the metal plate structure 22 and lining 24 continues along the well 20. The center well supports the grid which is subjected to an upward differential pressure by the air-steam injected into the fluid bed above the grid for fluidation and gasification of coke particles above the grid. The illustrated central location of the well is ideal inasmuch as radial differential expansion between the grid plate and the center well shell is through the use of the thermal insulating refractory linings on the upper grid surface and on the internal surface of the center well. The underside of the grid plate and the external surface of the well is cooled by the air-steam mixture injected into the fluid bed through the plurality of nozzle injectors referred to below. The thermal insulation on the surfaces keeps the metal at an essentially uniform temperature so that relatively lowcost steel such as carbon steel, rather than alloy steel, can be used for the grid-well construction. It will also be seen that the reactor vessel 10 also includes an outer steel shell 11 suitably lined with refractory insulation material 13.

Figure 2:
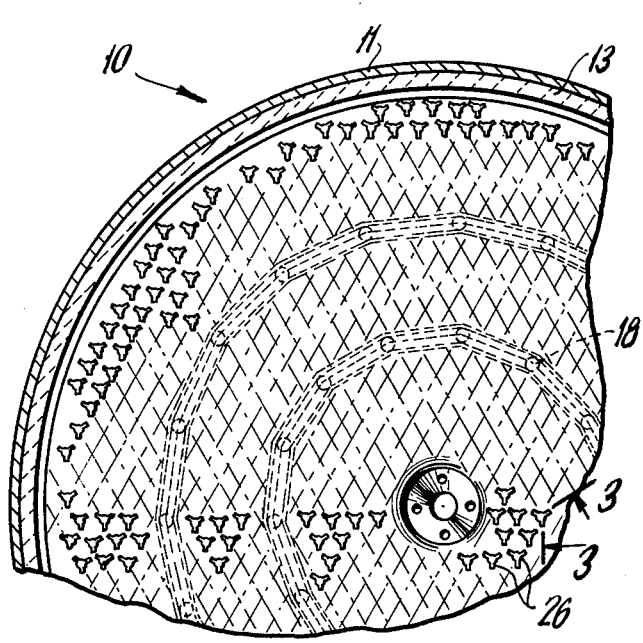
FIG. 2 is a fragmentary partly sectional plan view taken along line 2—2 of FIG. 1 in the direction of the arrows.
Figure 3:
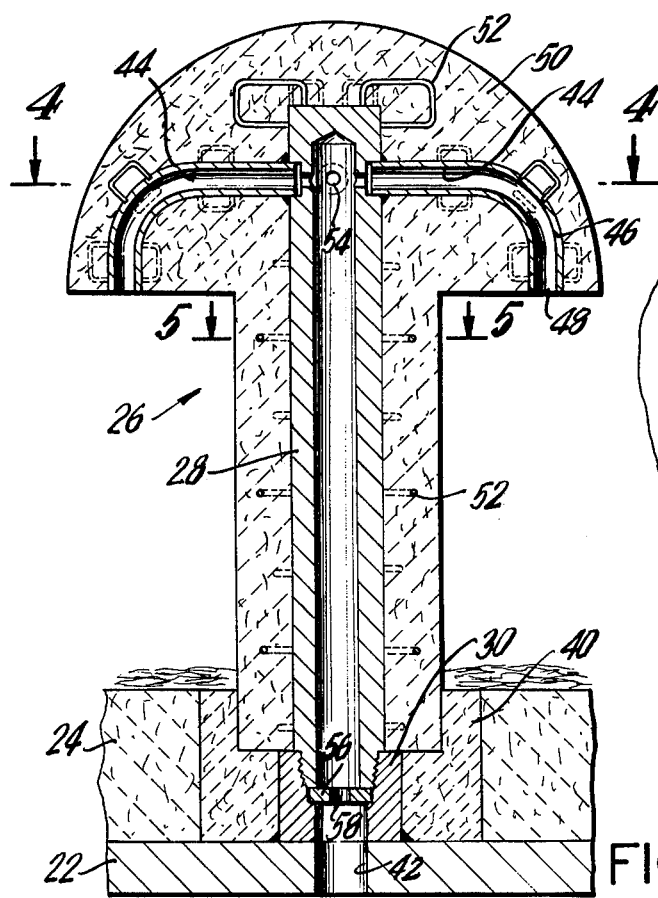
FIG. 3 is a sectional elevation of one embodiment of a nozzle according to the invention shown connected with a grid, taken along line 3—3 of FIG. 2 in the direction of the arrows with the structure being shown in FIG. 3 at a scale which is greatly enlarged as compared to FIG. 2.
Figure 4:
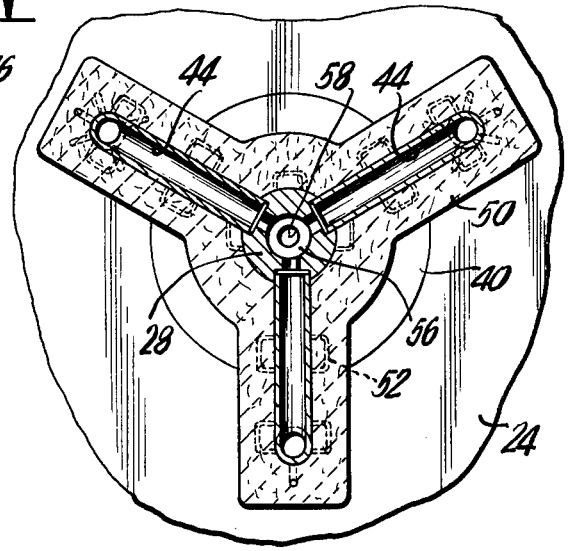
FIG. 4 is a sectional plan view of the structure of FIG. 3 taken along line 4—4 of FIG. 3 in the direction of the arrows.
Figure 5:
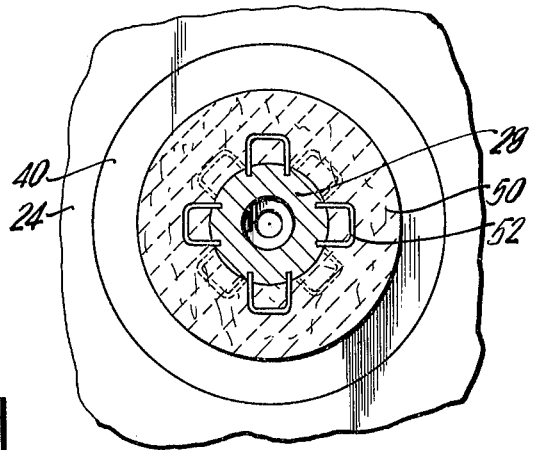
FIG. 5 is a sectional plan view of the structure of FIG. 3 taken along line 5—5 of FIG. 3 in the direction of the arrows.

FIG. 2 illustrates the arrangement of the supporting structures 18 along concentric circles as well as the relatively large number of closely spaced nozzle means 26 used for receiving the gas from the plenum chamber 12 and distributing the gas into the space in the vessel 10 above the grid therein. A preferred embodiment of nozzle means in accordance with the invention is illustrated in FIGS. 3–5. Thus, it will be seen from FIG. 3 in particular that the illustrated nozzle means includes an upright metal tubular portion 28 threaded into a nipple fitting 30 welded to the upper surface of the plate 22. Additional refractory or other insulation 40 may be packed about the nipple 30 after the nozzle 26 is installed to fill the space adjacent the refractory 24. The nipple 30 is coaxially aligned with an opening 42 passing through the plate 22 to provide communication between the plenum chamber and the interior of the upright tubular portion 28 of the nozzle means 26 which is illustrated in FIG. 3.

At the region of the upper end of nozzle means 26 is provided a plurality of tubular outlets 44 fixed to and projecting radially from the upright tubular portion 28 at the region of the upper end thereof, these nozzle outlets 44 being arranged as fully illustrated in FIG. 4 so that in the illustrated example they are spaced by 120° apart from each other around the axis of the upright tubular portion 28. The three tubular outlets 44 extend horizontally from the upper end region of the upright tubular portion 28, and then curve downwardly so as to terminate in downwardly extending portions 46 having downwardly directed open ends 48. As a result of this feature, the gas received from the plenum chamber is directed downwardly toward the grid and at the same time clogging of the nozzle outlets 48 is avoided.

The entire nozzle structure is covered by a refractory material 50 providing thermal insulation for the nozzle structure. Suitable anchoring wires 52 are welded to the exterior surface of the nozzle and distributed as illustrated so as to serve to anchor the refractory thermal-insulating material 50. For integral reinforcing of the refractory, alloy fibers are added to the refractory to control shrinkage and to facilitate anchoring of the refractory to the nozzle components 28 and 44 by means of anchor 52.

It will be noted that the internal diameters of the nozzle outlets 44 are smaller than the internal diameter of the upright tubular portion 28, so that a given pressure drop is provided in the gas issuing from the nozzles into the space of the grid. The upper end region of the tubular portion 28 is formed with relatively small orifices 54 through which the nozzle outlets communicate with the interior of the upright tubular portion 28, so that these orifices 54 contribute to the pressure drop in the gas flowing out of the nozzle means 26. With this placement of the second stage pressure drop orifice, even if one or more of the tubes 44 were to break off from the upright tube 28, the total nozzle pressure drop would remain essentially unchanged with little resultant maldistribution of gas flow in the bed.

According to a particular feature of the invention, a preliminary pressure-drop means is provided for providing a first stage pressure drop in the gas flowing from the plenum chamber to each nozzle means, prior to the pressure drop in the gas issuing out of the nozzle means at the outlets 44 thereof. In the example of FIG. 3, this preliminary pressure-drop means takes the form of a plate 56 extending across the bottom end of the upright tubular nozzle portion 28 and formed with an orifice 58. As the gas from the plenum chamber flows upwardly through the opening 42, it must flow through the orifice 58 and experiences a first stage pressure drop when flowing through the orifice 58, and then the second stage pressure drop is provided when the fluid flows through the three orifices 54 into each of the outlet nozzles 44.

This two-stage pressure drop is an important feature of the present invention inasmuch as in this way it is possible to achieve a uniform distribution of the gas over the grid and in the fluidized bed while at the same time maintaining attrition of the particles suspended in the fluidized bed to a minimum. Thus, the pattern of the injector nozzles is such as to promote a uniform distribution of gas across the grid surface. As previously brought out, the protected location of the first stage pressure drop orifice at the base of the tube 28 prevents severe flow maldistribution should tube 28 fail. Similarly, should either of the one or more outlet tubes 44 fail, the orifices 54 would remain unaffected. With the two-stage pressure drop of the invention it is possible to achieve a gas-exit velocity for each injection nozzle on the order of 150 feet per second, although this speed may range between 80 and 200 feet per second, and such a gas velocity is sufficient to maintain adequate pressure for uniform distribution.

It is desirable to provide a grid pressure drop of 0.4 times the static head of the fluid coke bed to achieve a good air-steam distribution. For this purpose there is maintained in the plenum chamber 12 a gas pressure on the order of 1–5 psig above bed pressure. For this particular pressure drop a velocity on the order of 225–350 feet per second would result in excessive attrition of petroleum coke particles in the fluidized bed as well as high loss of coke fines by entrainment in the effluent gas. Thus, referring to FIG. 1, in the case of treating petroleum coke particles in the fluidized bed, these particles will be gasified to extinction by the air-steam mixtures supplied to a low BTU fuel gas, primarily methane gas which flows out through the upper outlet 60 shown at the upper portion of FIG. 1. Petroleum coke particles are supplied to the fluidized bed 61 through the inlet 62, and excessive coke particles will flow out through the outlet 64. The temperature in the interior of the vessel 10 above the fluidized bed is on the order of 1500°–1800° F. Thus, the two-stage pressure drop provides less entrainment of coke particles through outlet 60 by reducing the velocity of the air-/steam entering the bed through nozzles 44 and 80.

Referring to FIG. 5, there is illustrated therein the circular configuration of the upright tubular portion 28 of the nozzle means together with the alloy fiber reinforced thermal insulation 50 and anchoring members 52. It is to be noted that the nozzle means can easily be replaced simply be being threaded out of the nipple fitting 30 and replaced by a new nozzle.

Figure 6:
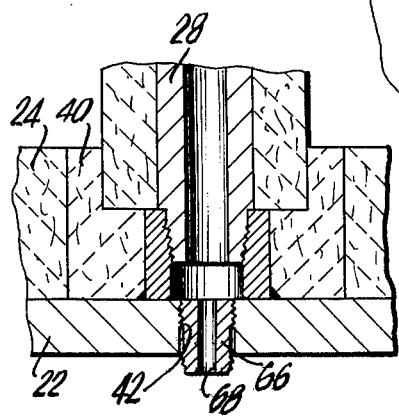
FIG. 6 is a fragmentary sectional elevation showing a different embodiment of a structure at the lower region of an upright tube of a nozzle.

Referring to FIG. 6, according to the embodiment illustrated therein instead as in FIG. 3 of providing the preliminary pressure drop by way of a plate 56 and an orifice 58 at the bottom end of the upright tubular portion 28, the preliminary pressure-drop means takes the form of a nipple 66 threaded into the opening 42 in the manner illustrated. In this case the bottom end of the upright tubular portion 28 of the nozzle means does not have a plate with an orifice extending across the same. The nipple 66 is formed with an elongated passage 68 coaxial with the upright tubular portion 28 of the nozzle and having a diameter smaller than the interior diameter of the upright tubular portion 28 so that through this nipple 66 it is also possible to achieve the preliminary pressure drop referred to above.

Figure 8:
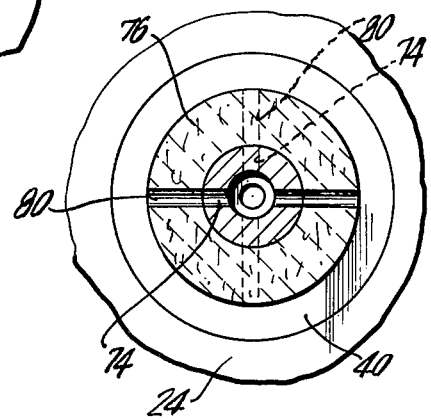
FIG. 8 is a sectional plan view of the nozzle of FIG. 7 taken along line 8—8 of FIG. 7 in the direction of the arrows.
Figure 7:
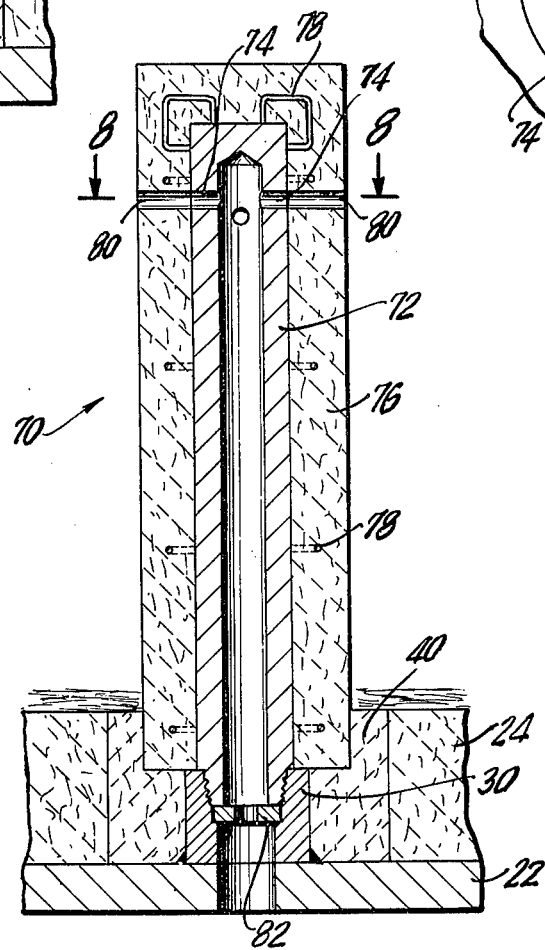
FIG. 7 is a sectional elevation of another embodiment of nozzle means according to the invention.

According to the embodiment of the invention which is illustrated in FIGS. 7 and 8, the nozzle means 70 is identical with the nozzle means 26 except that at the upper end region of the tubular portion 72, which otherwise is identical with the tubular portion 28, the nozzle means 70 only has horizontal openings 74 passing radially through the wall of the upright tubular portion 72 and distributed in the manner apparent from FIG. 8, these openings continuing through the thermal insulating layer 76 which may be made of the same material as the layer 50 and which also is anchored to the nozzle by way of anchoring wires 78 which may be identical with wires 52. Thus, the outlets 74 for the nozzle means 70 communicate with bores 80 formed in the insulating material 76 so that the bores 80 form extension of the bore 74, and while the several bores are arranged radially around the axis of the tubular portion 72 they may be vertically staggered, as is apparent from FIGS. 7 and 8.

With this arrangement also it is possible to achieve the results of the invention. It is to be noted that at the bottom end of the tubular portion 72 there is also an orifice plate 82 serving the same function as the orifice plate 56 in FIG. 3.

Undesirable clogging by coke particles of the nozzle outlet 74,80 may be avoided by providing a predetermined length to diameter ratio of these outlets. Thus, if this ratio is maintained between 1.8 and 3.0, backflow of coke during bed slump will be reliably avoided.

Thus, while the construction shown in FIG. 3 is preferred, it is also possible to use a construction as shown in FIGS. 7 and 8. The construction of FIG. 3 particularly avoids accumulation of slag on the nozzle tips.

The nozzle may be made of carbon steel or alloy steel having the refractory covering for corrosion, erosion and thermal protection. The slag which contains sulfur, sodium and vanadium compounds has been found to attack essentially all common structed alloys. The metals most resistant to such attack are the high chromium (i.e., 25–27% chrome alloys), but even this alloy requires protection by refractory for extended exposure. The refractory layer is cast around the metal structure of each nozzle and secured to the structure by the submerged alloy wire anchor loops which are welded to the exterior surface of the injector structure. Metal fiber reinforcing of the refractory in the amount of 1% fine wire fiber reinforcement by volume of refractory is added to the refractory. This provides added strength to the refractory, keeps the refractory layer together after initial shrinkage (and cracking) of the refractory on dryout, and facilitates anchorage to the structure by means of the submerged alloy wire loops. Castable refractory with high alumina ($Al_2O_3$) content (i.e., in excess of 55%) is required for corrosion attack resistance.

While specific embodiments of the invention have been shown and described in detail to illustrate the application of the inventive principles, it will be understood that the invention may be embodied otherwise without departing from such principles. For instance, while applicant has chosen to illustrate his nozzle assembly as providing a two-stage pressure drop, those skilled in the art will readily appreciate that if conditions warrant the total pressure drop across each assembly could be divided up into three or more stages to give even greater protection against gas flow maldistribution in the event of nozzle failure.

What is claimed is:
1. In a fluidized bed apparatus, such as a petroleum coke gasifier, an outer vessel having at a lower region thereof a plenum chamber and carrying at said lower region above said plenum chamber a grid which extends across said vessel, and said grid carrying a plurality of nozzle means distributed over said grid and communi- cating through said grid with said plenum chamber for receiving gas therefrom and distributing the gas into the space in said vessel over said grid for maintaining particles in a fluidized condition above said grid, each of said plurality of nozzle means providing a drop in the pressure of gas received from said plenum chamber as the gas flows out of said nozzle means into the space in the vessel above said grid, first orifice means situated adjacent said grid in the path of gas flow to each of said nozzle means to provide a preliminary drop in the pressure of the gas flowing from said plenum chamber to each nozzle means, and second orifice means at the outlet of said nozzle means to provide a secondary drop in the pressure of the gas flowing from said plenum chamber into the space above the grid, so that the total pressure drop between said plenum chamber and the space over said grid occurs in two distinct stages within said nozzle means.

2. The combination of claim 1 and wherein each nozzle means includes an upright tubular portion fixed to said grid and extending upwardly therefrom and said grid being formed with an opening passing therethrough in alignment with each upright tube of each nozzle means, so that the latter tube of each nozzle means communicates through said opening of said grid with said plenum chamber, and said first orifice means being situated at the region of the lower end of each upright tube of each nozzle means at each opening of said grid.

3. The combination of claim 2 and wherein said first orifice means includes a plate extending across the lower end of each upright tube of each nozzle means, and said plate being formed with an orifice passing therethrough and having a diameter smaller than the interior diameter of each upright tubular portion of each nozzle means for providing the preliminary pressure drop.

4. The combination of claim 2 and wherein said first orifice means of each nozzle means includes a nipple formed with a passage extending therethrough coaxially with the upright tubular portion of each nozzle means and having a diameter smaller than the interior diameter of the upright tubular portion of each nozzle means.

5. The combination of claim 2 and wherein said second orifice means includes at an upper end region of said upright tubular portion thereof a plurality of nozzle outlets extending radially from said upright tubular portion of each nozzle means at least in the region immediately adjacent said upright tubular portion of each nozzle means.

6. The combination of claim 5 and wherein said nozzle outlets of each nozzle means extend substantially horizontally throughout their entire length.

7. The combination of claim 6 and wherein said horizontal outlets of each nozzle means each have a length to diameter ratio which will prevent backflow of particles of the fluidized bed during bed slump.

8. The combination of claim 7 and wherein said ratio is between 1.8 and 3.0.

9. The combination of claim 5 and wherein each of the nozzle outlets of each nozzle means extends horizontally at a region adjacent said upright tubular portion and then curves downwardly and terminates in an outlet end directed downwardly toward the grid while being spaced above the latter.

10. The combination of claim 1 and wherein a refractory cover means covers each nozzle means at least at the region thereof extending above said grid, and refractory cover means also covering said grid at an upper surface thereof.

11. The combination of claim 1 and wherein said grid has an outer peripheral portion surrounding a central portion thereof, and said grid sloping downwardly from said outer peripheral portion toward said central portion thereof and having well means at said central portion for receiving deposits which become situated on said grid and migrate downwardly toward said well means.

12. The combination of claim 11 and wherein said well means extends downwardly through said plenum chamber to said outer vessel and contributes to the support of said grid.

13. The combination of claim 11 and wherein the inclination of said grid from said outer periphery toward said well means is on the order of 3°-5°.

14. The combination of claim 11 and wherein a refractory lining covers the inner surface of said well means.

15. An improved nozzle means adapted for mounting upon the supporting grid of a fluidized bed said nozzle means comprising a central elongated metal conduit of relatively large bore to cause minimal pressure drop upon gas flowing therethrough and adapted to be secured at a lower end thereof to said grid in a generally perpendicular relationship to the plane of said grid, first orifice means at said lower end of said conduit and disposed in the plane of said grid for establishing a first stage pressure drop upon a gas flowing from below said grid through said elongated conduit, and at least one second orifice means located at the opposite end of said conduit for establishing a second stage pressure drop upon a gas flowing from said conduit into the area of the fluidized bed above said grid whereby, even though the upper portion of said conduit may fail or fracture due to exposure to the environment of the fluidized bed, the first stage orifice means will remain operative at the lower end of said conduit.

16. The improved nozzle means of claim 15 wherein the upper end of said conduit includes three second orifice means spaced at 120° to each other, and curved second metal conduit means communicating with each of said second orifice means for directing the gas exiting therefrom in a downwardly direction toward the plane of said grid.

17. The improved nozzle means of claim 16 further including refractory insulation means covering the exterior surfaces of said first and second metal conduit means, said insulation means having dispersed therein fine metal wire reinforcement fibers.

18. The improved nozzle means of claim 17 wherein said fibers are 1% by volume of the refractory insulation means.

* * * * *